United States Patent
Heo et al.

(10) Patent No.: US 7,225,384 B2
(45) Date of Patent: May 29, 2007

(54) METHOD FOR CONTROLLING TURBO DECODING TIME IN A HIGH-SPEED PACKET DATA COMMUNICATION SYSTEM

(75) Inventors: Jin-Woo Heo, Songnam-shi (KR); Min-Goo Kim, Suwon-shi (KR); Jae-Hong Lee, Seoul (KR); Sang-Hyuck Ha, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 341 days.

(21) Appl. No.: 10/698,405

(22) Filed: Nov. 3, 2003

(65) Prior Publication Data

US 2004/0093548 A1 May 13, 2004

(30) Foreign Application Priority Data

Nov. 4, 2002 (KR) .................. 10-2002-0067756

(51) Int. Cl.
*H04L 1/18* (2006.01)
(52) U.S. Cl. ............................................. 714/749
(58) Field of Classification Search ............ 714/746, 714/748, 749, 750
See application file for complete search history.

(56) References Cited

U.S. PATENT DOCUMENTS

| | | | | |
|---|---|---|---|---|
| 6,907,005 | B1 * | 6/2005 | Dahlman et al. | 370/236 |
| 2001/0052104 | A1 * | 12/2001 | Xu et al. | 714/792 |
| 2004/0006734 | A1 * | 1/2004 | Shin et al. | 714/755 |

* cited by examiner

*Primary Examiner*—James C Kerveros
(74) *Attorney, Agent, or Firm*—Roylance, Abrams, Berdo & Goodman, L.L.P.

(57) ABSTRACT

A method for controlling a turbo decoding time in a high-speed packet data communication system. In a mobile communication system which receives a control message from a packet data control channel, at the same time receives packet data from the packet data channel, performs demodulating and turbo-decoding of the packet data during a predetermined response (ACK/NAK) time delay using a demodulation result of the packet data control channel, creates a result of the turbo decoding in the form of a response (ACK/NAK) signal, and transmits the turbo decoding result, the method includes the steps of a) demodulating the control message when simultaneously receiving the control message and the packet data, and demodulating and decoding the packet data, and b) if the response time delay expires while decoding the packet data, interrupting a decoding operation of the turbo decoder.

22 Claims, 8 Drawing Sheets

METHOD FOR CONTROLLING TURBO DECODING TIME IN A HIGH-SPEED PACKET DATA COMMUNICATION SYSTEM

This application claims priority to an application entitled "METHOD FOR CONTROLLING TURBO DECODING TIME IN HIGH-SPEED PACKET DATA COMMUNICATION SYSTEM", filed in the Korean Intellectual Property Office on Nov. 4, 2002 and assigned Ser. No. 2002-67756, the contents of which are incorporated herein by reference.

BACKGROUND OF THE INVENTION

1. Field of the Invention

The present invention relates to a mobile communication system, and more particularly to a method for providing Hybrid Automatic Repeat Request (HARQ) in a high-speed packet data communication system.

2. Description of the Related Art

Typically, when there is a need for a mobile communication system to perform high-speed data transmission, the mobile communication system adapts a Hybrid Automatic Repeat Request (HARQ) scheme to increase transmission efficiency (i.e., transmission throughput). Particularly, the HARQ scheme has been frequently adapted to a specific channel (e.g., a forward channel for a mobile communication system) in which channel status is abruptly changed and other service traffic channels are contained. With the increasing development of high-speed data transmission services, many developers have conducted intensive research into new mobile communication technologies for adapting a new HARQ scheme using a variable code rate Error Correction Code (ECC) instead of a conventional HARQ scheme using a fixed code rate ECC.

Code Division Multiple Access 2000 (CDMA2000) First Evolution Data and Voice (1x EV-DV) system adapts two channels to perform packet data transmission, i.e., an Forward Packet Data Channel (F-PDCH) for use in payload traffic, and an Forward Packet Data Control Channel (F-PDCCH) for controlling the F-PDCH. The F-PDCH is a channel for transmitting an Encoder Packet (EP) serving as a transmission data block, and a maximum of 2 channels may be available for the F-PDCH, such that the F-PDCH can simultaneously transmit individual EPs to two terminals using a Code Division Multiplexing (CDM) scheme.

A method for transmitting EPs over the above F-PDCH will hereinafter be described in detail.

Each EP is encoded by a turbo encoder, and is divided into 4 subpackets having different Increment Redundancy IR patterns using a Quasi-Complementary Turbo Code (QCTC) symbol selection process. The subpacket functions as a basic unit for an initial transmission mode or a re-transmission mode. For the initial transmission or re-transmission mode, IR patterns of individual subpackets are distinguished from each other according an Subpacket Identifier (SPID). A subpacket-based modulation scheme (e.g., Quaternary Phase Shift Keying (QPSK), 8 Phase Shift Keying (PSK), or 16 Quadrature Amplitude Modulation (QAM) and a transmission slot length (e.g., 1, 2, or 4 slots) are determined according to forward channel quality information of a terminal and a variety of resource conditions (e.g., the number of Walsh codes allocatable to the F-PDCH and power information, etc.) of a Base Station (BS).

F-PDCCH having information associated with demodulation and decoding of the F-PDCH is multiplexed along with the F-PDCH over an orthogonal channel different from that of the F-PDCH in the same slot period as in the F-PDCH, and is then transmitted to a mobile station (MS). The information associated with demodulation and decoding of the F-PDCH contains ARQ Channel ID (ACID) information for classifying ARQ channels, EP-SIZE information for indicating an EP's bit size, and EP-NEW information for discriminating between two successive EPs contained in the same ARQ channel.

A method for receiving transmission packet data and packet data control information will hereinafter be described in detail.

The Moblie Station (MS) decodes the F-PDCCH, and determines if the transmission packet is its own packet. If it is determined that the transmission packet is the MS's packet, the MS demodulates and decodes the F-PDCH. If the current reception subpacket is a predetermined packet created by re-transmission of a previously-received EP, the MS performs code combining with code symbols of the previously-received EP in such a way that a decoding operation is performed. If the decoding process is successfully performed, the MS transmits an Acknowledgement (ACK) signal over an Reverse—ACK/NAK transmission Channel (R-ACKCH) to command the BS to transmit the next EP. Otherwise, if the decoding process is unsuccessful, the MS transmits the NAK signal to command the BS to re-transmit the same EP. A physical layer HARQ operation unit associated with a single EP is typically called an ARQ channel. The CDMA2000 1x EV-DV standard has disclosed that a maximum of 4 ARQ channel operations are made available at one time, and this is denoted by "N=4 Fast HARQ channel".

The CDMA2000 1x EV-DV standard controls the MS to inform the BS of a predetermined ACK/NAK time delay and the number of ARQ channels available at one time, and this is considered to be the most important implementation issue of the MS. The ACK/NAK time delay is needed for the MS to perform a packet reception operation and transmit the ACK/NAK signal. The ACK/NAK time delay supported by the MS may be one slot (i.e., 1-slot) of 1.25 msec or two slots (i.e., 2-slots). The number of ARQ channels may be 2, 3, or 4.

The CDMA2000 1x EV-DV standard has adapted a QCTC scheme as an encoding scheme available for a high-speed HARQ. The QCTC scheme provides a variable code rate, and guarantees the improvement of soft-combining operation created by the HARQ. According to the CDMA2000 1x EV-DV standard, packet data transmission/reception is established by a physical layer HARQ operation structure. This physical layer HARQ operation structure indicates that some parts of all HARQ operations move to a physical layer such that it can acquire a high response rate and a high processing rate, whereas an ACK/NAK response associated with a conventional data re-transmission process and its associated HARQ operation have been performed in an upper layer. Considering function and role aspects, the physical layer HARQ may be contained in a MUX layer existing in a Media Access Control (MAC) layer. The physical layer determines if data re-transmission is performed, such that a processing time consumed for the same data can be shortened. If the upper layer transmits the NAK signal, it is impossible for the upper layer to perform soft-combining of the same data. However, if the physical layer transmits a NAK signal, it can perform soft-combining of code symbols associated with the same EP, resulting in increased use efficiency of channel resources. Preferably, the HARQ protocol is transferred to a predetermined place under the MUX layer contained in the MAC layer such that the physical layer can perform the HARQ operation. The physical layer HARQ implemented under the MUX layer is also called a Fast HARQ. A conventional RLP-based ARQ control scheme creates a considerable round trip delay of a minimum of 200 msec for a predetermined period of time during which an NAK signal is received after performing one-packet transmission and then a re-transmission packet associated with the NAK signal is transmitted. Contrary to the above RLP-based ARQ control scheme, the physical layer HARQ control scheme creates a very low round trip delay of a minimum of a few milliseconds.

As stated above, provided that the conventional HARQ control operation for use in the upper layer is performed under the MUX layer, a high-speed HARQ response and process needed for high-speed data transmission is made available. However, this solution is merely a logical solution available in the range of a standard specification, such that it has the following disadvantages in real cases.

Most mobile communication systems currently implement the upper layer having the MUX layer using a software program stored in a Central Processing Unit (CPU), however, the CPU for use in the MS does not have a good processing speed and capacity. Therefore, if the HARQ protocol requesting such a rapid response is implemented with the MS's CPU, overload unexpectedly occurs in the CPU's clocks, such that the MS may be operate incorrectly.

N independent HARQ controllers and N independent turbo decoders are needed to support an N-channel HARQ. The number of HARQ controllers and the number of turbo decoders increase in proportion to the value of 'N', resulting in increased power-consumption and complexity of the MS. In conclusion, there must be implemented new technology capable of supporting the N-channel HARQ using a minimum number of HARQ controllers and a minimum number of turbo decoders.

SUMMARY OF THE INVENTION

It is an object of the present invention to provide a method for controlling a turbo decoding time to support a high-speed HARQ operation in a high-speed packet data communication system.

It is another object of the present invention to provide a method for controlling a turbo decoding time to reduce power-consumption of an Mobile Station (MS) in a high-speed packet data communication system.

It is yet another object of the present invention to provide a method for controlling a turbo decoding time to reduce hardware complexity of the MS in a high-speed packet data communication system.

It is yet another object of the present invention to provide a method for controlling a turbo decoding time, which reduces power-consumption and hardware complexity of the MS, and at the same time supports a high-speed HARQ operation in a high-speed packet data communication system.

It is yet another object of the present invention to provide a method for improving a packet data decoding performance in a high-speed packet data communication system.

It is yet another object of the present invention to provide a method for efficiently decoding a plurality of subpackets using only one turbo decoder when the MS for use in the high-speed packet data communication system receives one subpacket and then the next slot receives another subpacket.

It is yet another object of the present invention to provide a method for allocating a turbo decoding time to individual subpackets, which efficiently decodes a plurality of subpackets using only one turbo decoder when the MS for use in the high-speed packet data communication system receives one subpacket and then the next slot receives another subpacket.

In accordance with one aspect of the present invention, the above and other objects can be substantially accomplished by the provision of a method for controlling a turbo decoding time of a turbo decoder in a mobile communication system which receives a control message from a packet data control channel, at the same time receives packet data from the packet data channel, performs demodulating and turbo-decoding of the packet data during a predetermined response (ACK/NAK) time delay using a demodulation result of the packet data control channel, creates a result of the turbo decoding in the form of a response (ACK/NAK) signal, and transmits the turbo decoding result, the method comprising the steps of a) demodulating and decoding the control message when simultaneously receiving the control message and the packet data, and demodulating and decoding the packet data; and b) if the response time delay expires while decoding the packet data, interrupting a decoding operation of the turbo decoder.

In accordance with another aspect of the present invention, there is provided a method for controlling a turbo decoding time of a turbo decoder when a first packet data signal and a second packet data signal are successively receive in a mobile communication system which receives a control message from a packet data control channel, at the same time receives packet data from the packet data channel, performs demodulating and turbo-decoding of the packet data during a response (ACK/NAK) time delay of predetermined 1 or 2 slot using a demodulation result of the packet data control channel, creates a result of the turbo decoding in the form of a response (ACK/NAK) signal, and transmits the turbo decoding result, the method comprising the steps of a) decoding a first control message when simultaneously receiving the first control message and the first packet data, and demodulating and decoding the first packet data; b) decoding the first control message when simultaneously receiving a second control message and the second packet data, and demodulating the second packet data; and c) if the decoding of the first packet data is still in operation at a demodulation completion end time of the second packet data, interrupting the decoding of the first packet data of the turbo decoder at a predetermined time before a response (ACK/NAK) time delay of the first packet data expires.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
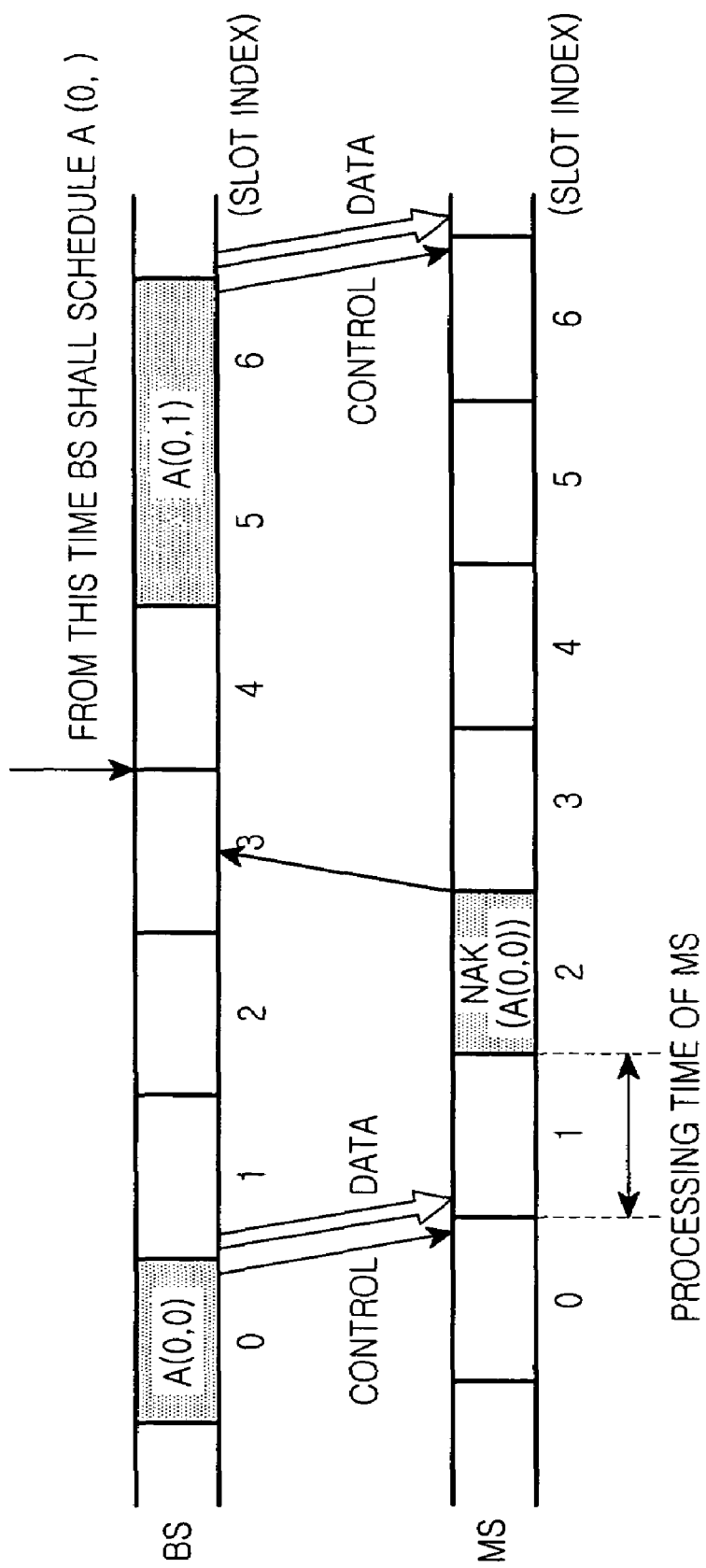
FIG. 1 is a block diagram illustrating an example of a physical layer Hybrid Automatic Repeat Request (HARQ) operation when an ACK/NAK time delay is equal to one slot in a high-speed packet data communication system.

Several embodiments of the present invention will be described in detail with reference to the accompanying drawings. In the drawings, the same or similar elements are denoted by the same reference numerals. In the following description, a detailed description of known functions and configurations incorporated herein will be omitted for conciseness.

The embodiments of the present invention relate to a method for controlling a turbo decoding time to be allocated to individual subpackets when one subpacket is received in an Mobile Station (MS) of a high-speed packet data communication system such as a Code Division Multiple Access 2000 (CDMA2000) First Evolution Data and Voice (1x EV-DV), and then the other subpacket is received in the next slot, such that it can efficiently control the decoding operation of subpackets using only one turbo decoder.

A physical layer HARQ operation caused by the ACK/NAK time delay in the CDMA2000 1x EV-DV communication system (hereinafter referred to as a high-speed packet data communication system) will hereinafter be described with reference to FIGS. 1 and 2.

FIG. 1 is an example of the physical layer HARQ operation when the ACK/NAK time delay is equal to one slot (i.e., 1-slot) in the high-speed packet data communication system. FIG. 2 is an example of the physical layer HARQ operation when the ACK/NAK time delay is equal to 2-slots in the high-speed packet data communication system.

Figure 2:
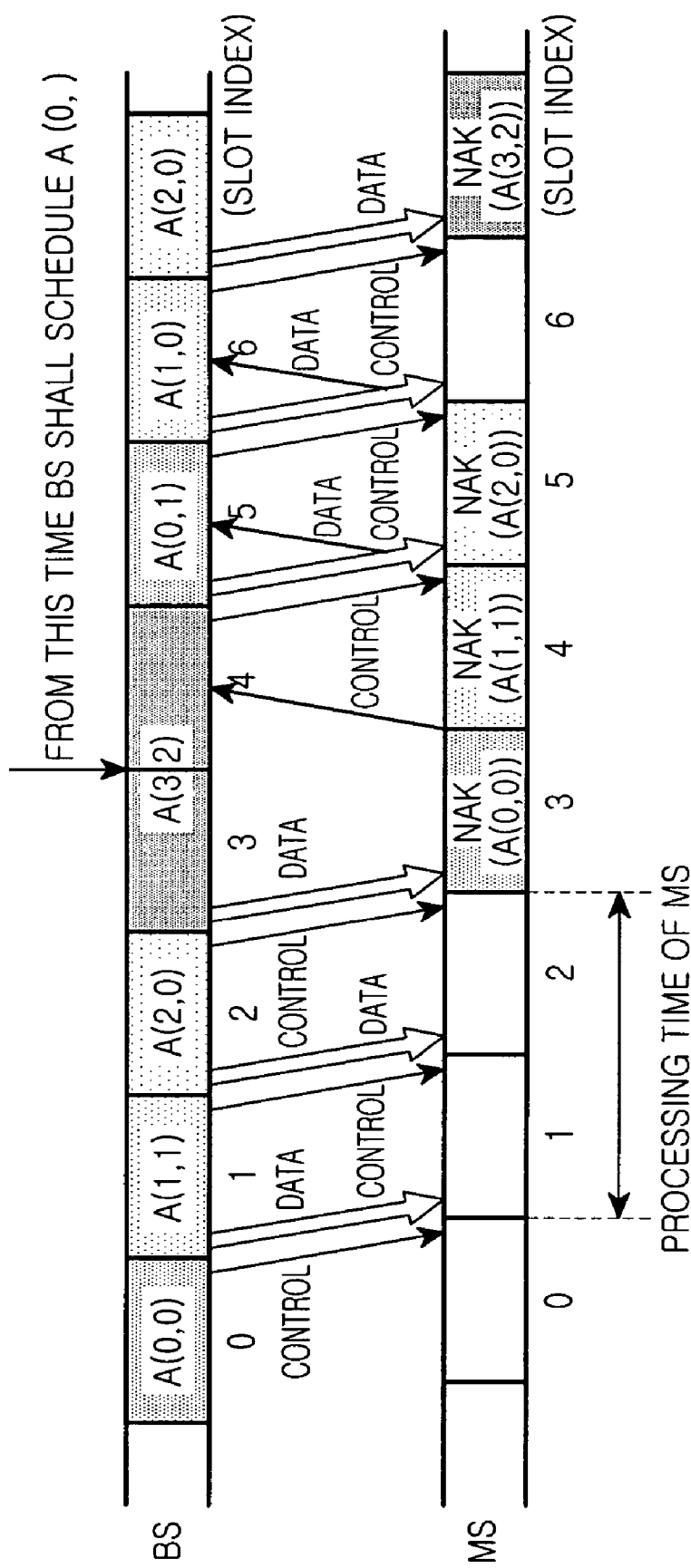
FIG. 2 is a block diagram illustrating an example of a physical layer HARQ operation when an ACK/NAK time delay is equal to 2-slots in the high-speed packet data communication system.

Referring to the reference character "A(x,y)" shown in FIGS. 1 and 2, "A" indicates an MS to which a packet data channel F-PDCH and a packet data control channel Forward Packet Data Control Channel (F-PDCCH) are allocated, "x" indicates an ARQ channel, and "y" indicates a specific symbol for classifying an Increment Redundancy (IR) pattern associated with the same Encoder Packet (EP).

Referring to FIGS. 1 and 2, the Base Station (BS) transmits a subpacket A(0,0) to the F-PDCH, and transmits a control message indicative of the subpacket A(0,0) over the F-PDCCH. If the ACK/NAK time delay is equal to 1-slot, the MS decodes the F-PDCCH, demodulates the F-PDCH, and performs a turbo decoding operation during the one-slot time after it has performed packet reception, such that it transmits the result signal ACK/NAK to the next slot over an Reverse-ACK CHannel (R-ACKCH). If the ACK/NAK time delay is equal to 2-slots, the MS transmits the ACK/NAK signal after the lapse of 2-slots.

As shown in FIGS. 1 and 2, the MS's operation time varies with the ACK/NAK time delay of 1-slot or 2-slots so as to enable a data processing time to be selected according to different designs of the MS's receiver, such that the MS's reception performance can be guaranteed in high-speed data transmission. In this case, a predetermined time is consumed while a PDCCH decoder of the MS starts decoding the subpacket's F-PDCCH and the MS's transmitter transmits the ACK/NAK signal associated with the subpacket. This predetermined time will hereinafter be described.

T1 is a time needed for the PDCCH decoder of the MS to perform F-PDCCH decoding, and is equal to a predetermined time corresponding to the number of blind detections to be executed to acquire an F-PDCCH's transmission format.

T2 is a time needed for the PDCCH demodulator of the MS to demodulate a symbol of the F-PDCCH, and may have different operation times for every subpacket according to the number of modulated symbols and modulation scheme for every subpacket.

T3 is a time needed for the PDCH turbo decoder of the MS to perform F-PDCH turbo decoding, and varies with the EP's size and the number of turbo-decoding repeating times.

T4 indicates a time delay needed for the MS's receiver to perform multi-path combining, means a predetermined time consumed while the MS's transmitter transmits the ACK/NAK response signal, and is an almost constant time irrespective of packet data reception.

During the T1 time, the MS performs blind detection in individual transmission modes of 1-slot length, 2-slots length, and 4-slot length, such that it can determine if a corresponding F-PDCCH has been allocated to the MS itself. If needed, the MS may determine that the F-PDCCH is allocated to the MS itself using one-time blind detection, or may have to perform the blind detection several times corresponding to an available maximum number of blind detections. The T1 time is variably determined according to which one of the blind detections enables the MS to acquire the MS's subpacket control information. In order words, the T1 time varies with ordinal number information of the blind detections. The T2 time varies with a transmission parameter of the subpacket. The T2 time is a time delay of multi-path combining, is a propagation time delay of a radio channel signal, and is an almost constant time irrespective of a subpacket processing time, such that a slot boundary time of the MS's receiver is different from that of the MS's transmitter by the T4 time. Therefore, the ACK/NAK response for a corresponding subpacket must be determined at a starting point of the T4 time. The T3 time is consumed while the turbo decoder performs a decoding operation, and varies with the EP size and the number of turbo-decoding repeating times.

1-slot or 2-slots time assigned to the MS as a subpacket processing time is a very short time, whereas the CDMA2000 1x system processes a frame of 20 ms having the same encoder size within a predetermined time of 20 ms. However, the standard specification has prescribed that a desired operation should be executed within a limited time to establish high-speed data transmission. It should be noted that the MS must process subpackets within a predetermined time from the T1 time to the T3 time simultaneously with maximizing their reception performance. The reception performance of subpackets is greatly dependent on the T3 time indicative of a turbo decoding time. It is well known to those skilled in the art that a real turbo decoder enhances its own performance by gradually increasing the number of decoding repeating times at the same Signal to Noise Ratio (SNR). Briefly, the turbo decoder has a higher performance in proportion to the number of decoding repeating times. Therefore, the T3 time must be lengthened to increase the number of decoding repeating times. However, the MS processing time cannot exceed a given ACK/NAK time delay, such that the T3 time is limited at all times. In order to solve this problem, when the given ACK/NAK time delay is set to 1-slot or 2-slots, the T3 time must be maximally allocated to the 1-slot or the 2-slots in order to maximize the number of turbo-decoding repeating times in a corresponding slot, and must allow a following subpacket received in the next slot to use the turbo decoder.

Figure 3:
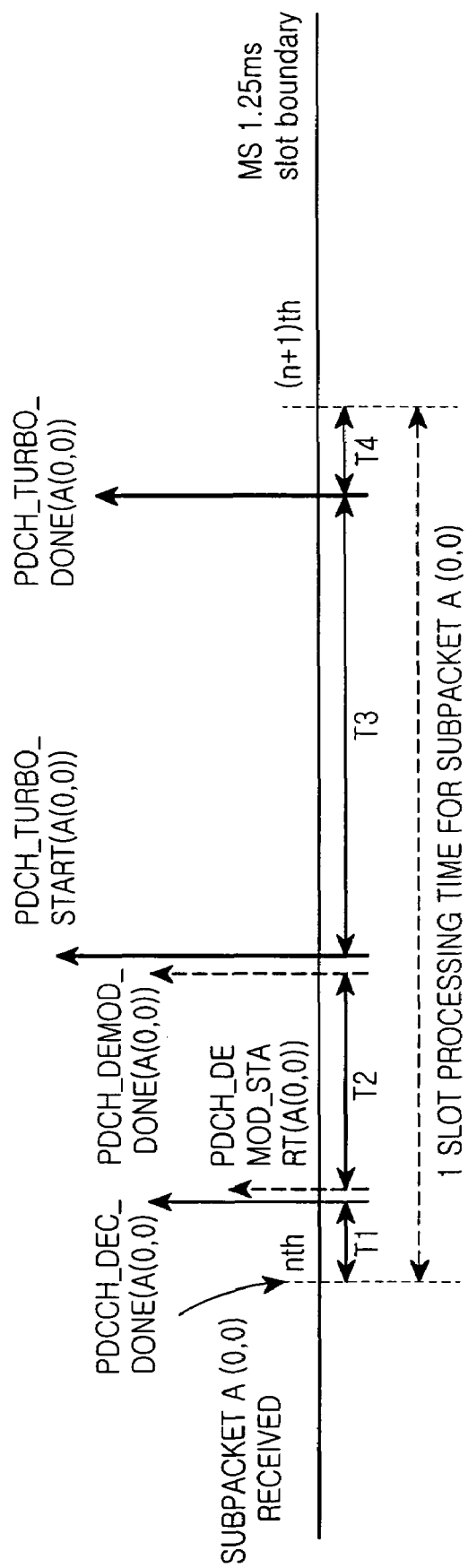
FIG. 3 is a timing diagram illustrating the timing relationship between individual operations when the ACK/NAK time delay is equal to one slot in the high-speed packet data communication system, the individual operations being performed for a predetermined time during which the Mobile Station (MS) starts decoding an Forward Packet Data Control Channel (F-PDCCH) of each subpacket and then transmits an ACK/NAK response signal associated with the subpacket.
Figure 4:
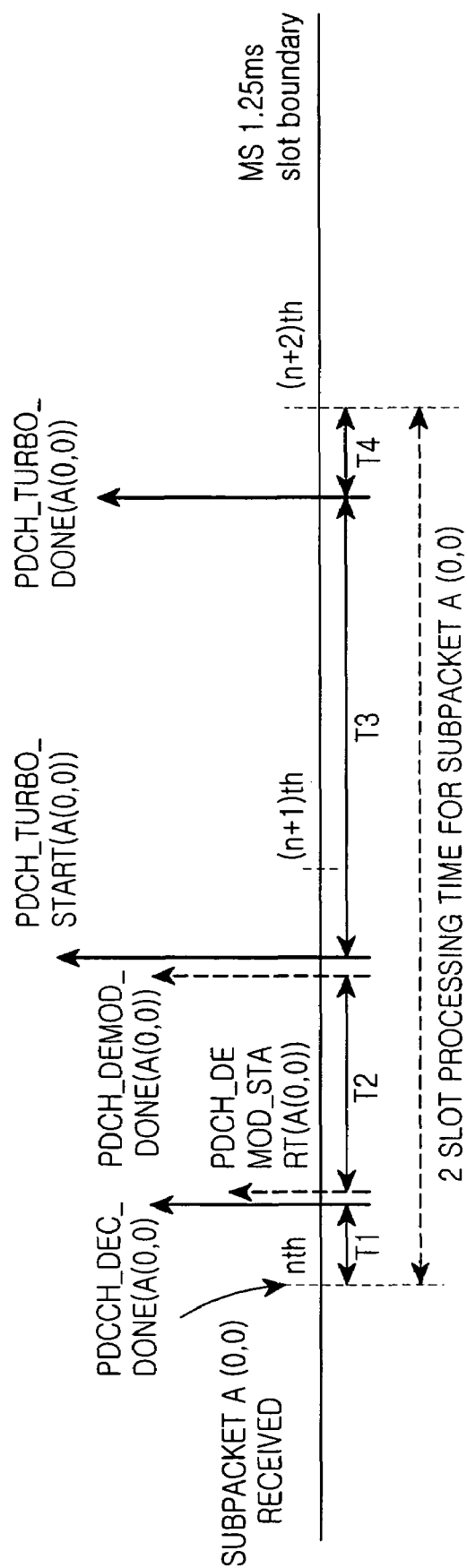
FIG. 4 is a timing diagram illustrating the timing relationship between individual operations when the ACK/NAK time delay is equal to 2-slots in the high-speed packet data communication system, the individual operations being performed for a predetermined time during which the MS starts decoding an F-PDCCH of each subpacket and then transmits an ACK/NAK response signal associated with the subpacket.
Figure 5:
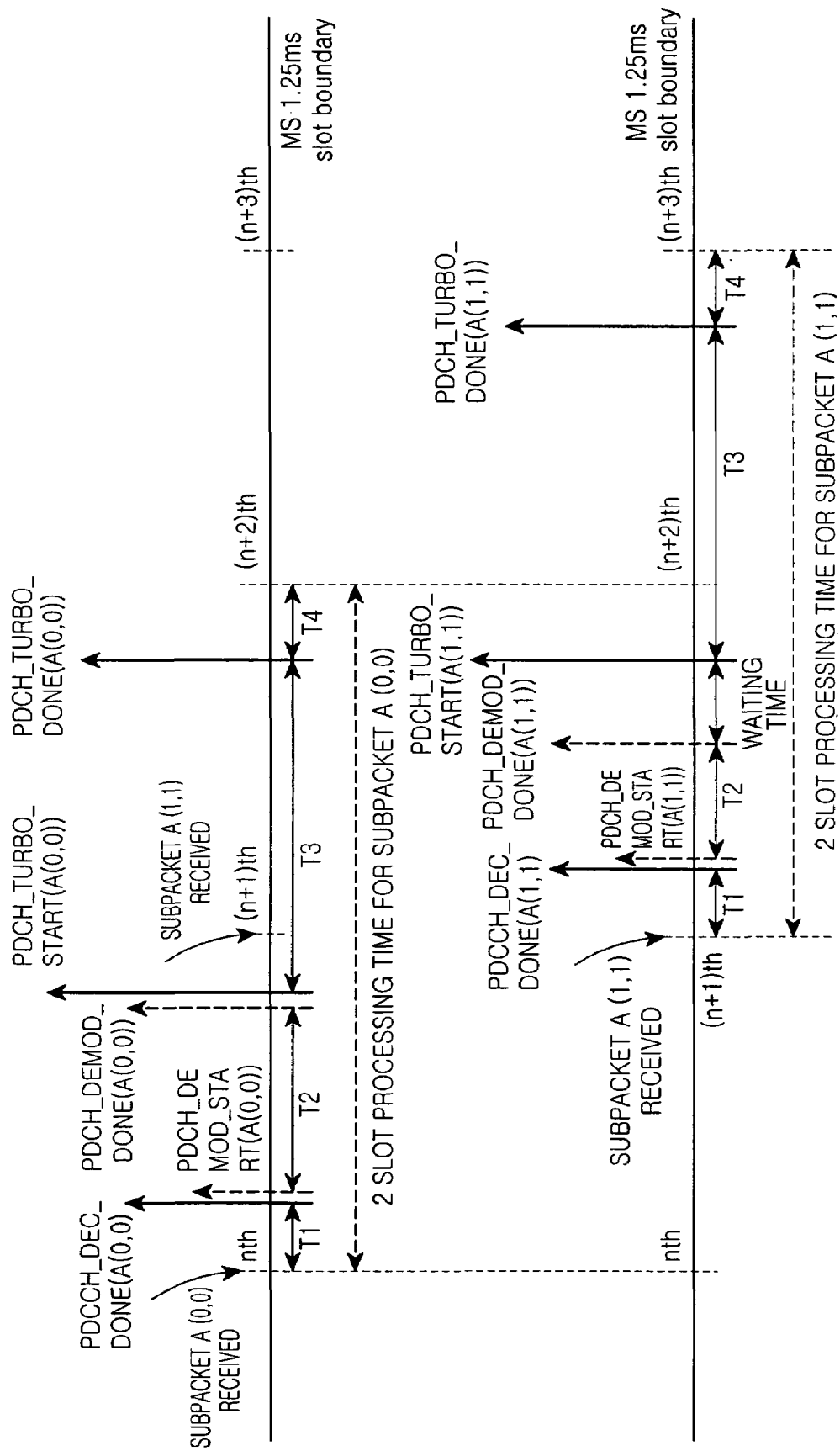
FIG. 5 is a timing diagram illustrating the timing relationship between individual operations when the ACK/NAK time delay is equal to 2-slots in the high-speed packet data communication system, one subpacket is received in the MS, and the other subpacket is then received in the next slot, the individual operations being performed for a predetermined time during which the MS starts decoding an F-PDCCH of each subpacket and then transmits an ACK/NAK response signal associated with the subpacket.

FIGS. 3, 4, and 5 depict MS processing times varying with the ACK/NAK time delay. Specifically, each MS processing time is created while the MS receives a subpacket and then transmits an ACK/NAK signal related to the received subpacket, and is graphically shown in the individual drawings using the reference characters T1, T2, T3, and T4.

FIG. 3 is a timing diagram illustrating the timing relationship between individual operations when the ACK/NAK time delay is equal to 1-slot in the high-speed packet data communication system, the individual operations being performed for a predetermined time during which the MS starts decoding an F-PDCCH of each subpacket and then transmits an ACK/NAK response signal associated with the subpacket.

Referring to FIG. 3, the PDCCH_DEC_DONE A(0,0) signal indicates that F-PDCCH decoding is performed and completed on the basis of a reception time of the subpacket A(0,0). The PDCH_DEMOD_START A(0,0) signal indicates a start point of the F-PDCH subpacket demodulation using F-PDCCH reception information, and the PDCH_DEMOD_DONE A(0,0) signal indicates an end point of the F-PDCH subpacket demodulation using the F-PDCCH reception information. The PDCH_TURBO_START A(0,0) signal indicates a start point of the F-PDCH subpacket decoding, and PDCH_TURBO_DONE A(0,0) signal indicates an end point of the F-PDCH subpacket decoding. In the case of 1-slot ACK/NAK time delay, the MS processing time ranging from the T1 time to the T3 time is contained in the 1-slot time, as shown in FIG. 3. Here, the T3 time is a short time contained in the 1-slot time. Therefore, provided that the MS performs turbo decoding until reaching the T4 time at which ACK/NAK values are transmitted, a maximum decoding time is created such that the MS can increase its reception performance.

FIG. 4 is a timing diagram illustrating the timing relationship between individual operations if the ACK/NAK time delay is equal to 2-slots in the high-speed packet data communication system, and there is no reception subpacket until transmitting a response signal for one subpacket. The individual operations are performed for a predetermined time during which the MS starts decoding an F-PDCCH of the subpacket and then transmits an ACK/NAK response signal associated with the subpacket.

Referring to FIG. 4, the T3 time serving as a turbo-decoding time for the subpacket is in the range from a first slot to a second slot on the basis of a reception time of a predetermined subpacket A(0,0). This T3 time shown in FIG. 4 is longer than that of the aforementioned case having the ACK/NAK time delay of 1-slot by the 1-slot time. In order to create much more turbo decoding time in the case of FIG. 4, the MS receiving the subpacket must perform turbo decoding until reaching the T4 time serving as a transmission timing of the ACK/NAK value.

FIG. 5 is a timing diagram illustrating the timing relationship between individual operations when the ACK/NAK time delay is equal to 2-slots in the high-speed packet data communication system, one subpacket is received in the MS, and the other subpacket is then received in the next slot. The individual operations are performed for a predetermined time during which the MS starts decoding an F-PDCCH of the subpacket and then transmits an ACK/NAK response signal associated with the subpacket.

In the case where the MS receives one subpacket A(0,0) and then receives the other subpacket A(1,1) in the next slot using only one turbo decoder, T1 to T4 times associated with individual subpackets are shown in FIG. 5. In the case of FIG. 5, the MS may perform turbo decoding for individual subpackets using two turbo decoders in order to create a processing time for every subpacket as shown in FIG. 4. However, this case of using two turbo decoders in the MS typically requesting low power and low production cost is not cost-effective. Therefore, a new method using only one turbo decoder instead of using two turbo decoders is more cost-effective in such a way that individual subpackets are shared with the single turbo decoder. In this case, a specific slot time between the (n+1)-th slot boundary and the (n+2)-th slot boundary is occupied by the T3 time of the subpacket A(0,0) and the other T3 time of the subpacket A(1,1). It should be noted that the MS can perform turbo decoding for the subpacket A(1,1) after a turbo decoding operation for the subpacket A(0,0) has been completed. In this case, this turbo-decoding completion can be differently understood according to the following two meanings, i.e., EP's successful decoding, and decoding interruption. The signal indicative of the decoding interruption occurs when the turbo decoder determines that more decoding operations are meaningless. The MS's turbo-decoding operation for the subpacket A(1,1) is delayed until the turbo decoder is enabled. This delay time is denoted by the Waiting Time in FIG. 5. In this case, the longer the time occupied by the turbo decoder of the subpacket A(0,0), the shorter the turbo decoding time of the subpacket A(1,1), such that there is a need to limit the turbo decoder occupancy time of the previously-arrived subpacket A(0,0).

First to third methods for limiting the turbo decoder occupancy time will hereinafter be described.

The first method controls the turbo decoder occupancy time such that a turbo decoding time of the first packet data is equal to that of the second packet data.

The second method limits the turbo decoder occupancy time by determining whether the first packet data and the second packet data are initial-transmission data or re-transmission data. Specifically, provided that the first packet data is such initial-transmission data and the second packet data is such re-transmission data, a much longer turbo decoding time is allocated to the first packet data.

As for the third method, because a shorter turbo decoding time is consumed when the EP size is a low value in association with the same number of turbo-decoding repeating times, whereas a longer turbo decoding time is consumed when the EP size is a high value in association with the same number of turbo-decoding repeating times, the third method assigns a much longer decoding time to the large-sized subpacket having the high EP-size value as compared to the small-sized subpacket having the low EP-size value.

The embodiment of the present invention provides a control method for assigning the maximum time to the turbo decoder to enhance subpacket reception performance of the MS. The embodiment of the present invention further provides another control method using individual EP size information when the ACK/NAK time delay is set to 2-slots and successive subpackets are received in the MS, such that two subpackets can occupy different decoding times using only one turbo decoder. In this case, the turbo decoding time may be controlled by either a high-speed HARQ controller or an additional controller. For convenience of description and to provide a better understanding of the embodiment of the present invention, the high-speed HARQ controller or the additional controller will hereinafter be referred to as a controller.

The method for controlling the turbo decoding time according to the embodiment of the present invention will hereinafter be described in different cases, i.e., a first case where the ACK/NAK time delay is set to 1-slot as shown in FIG. 3, and a second case where the ACK/NAK time delay is set to 2-slots as shown in FIGS. 4 and 5.

A. Method for Controlling Turbo Decoding Time when ACK/NAK Time Delay is Set to 1-Slot:

Method (a)

This method (a) is adapted in the case where the ACK/NAK time delay is set to 1-slot as shown in FIG. 3. If the PDCH demodulator generates the PDCH_DEMO_DONE signal indicative of demodulation completion the F-PDCH, the controller generates the PDCH_TURBO_START signal used for commanding the turbo decoder to begin turbo decoding associated with a received subpacket, such that the turbo decoder can perform turbo decoding of the PDCH. In order to determine whether the turbo decoder should terminate the turbo decoding of the PDCH, the controller determines whether the turbo decoder has generated the PDCH_TURBO_DONE signal indicative of the PDCH's turbo-decoding completion. If the turbo decoder has generated the PDCH_TURBO_DONE signal, the controller escapes from the turbo decoding execution mode. Otherwise, if the turbo decoder does not generate the PDCH_TURBO_DONE signal, the controller determines whether the ACK/NAK response signal for a corresponding subpacket precedes a specific encoding execution time of the R-ACKCH encoder of the MS's transmitter by a predetermined time. In order to determine the specific encoding execution time, the controller generates the WL125_PROC signal indicative of the specific time arrival status at a time earlier than the encoding start time of the R-ACKCH encoder of the MS's transmitter by a predetermined time. If no WL_125_PROC signal is created, the controller returns to the step for determining whether the PDCH_TURBO_DONE signal has been created. Otherwise, if the WL_125_PROC signal has been created, the controller transmits the INT_STOP signal to the turbo decoder to compulsorily interrupt operations of the turbo decoder, receives the PDCH_TURBO_DONE signal from the turbo decoder, stores the decoding result, and finally escapes from the turbo decoding operation execution status of a corresponding subpacket. The decoding result is adapted as an entry signal of the R-ACKCH encoder, and is then transferred to the BS. The turbo decoder enters a waiting mode on the condition that a decoding operation for the next subpacket is made available. The above-identified turbo decoding time control method is characterized by the fact that the decoder stops operating on the condition that a prescribed status is provided when the turbo decoder performs turbo decoding of a corresponding subpacket. That is, when the ACK/NAK time delay expires and a desired signal arrives at a time earlier than the encoding start time of the ACK/NAK response signal in the R-ACKCH encoder of the MS's transmitter by a predetermined time.

B. Methods for Controlling Turbo Decoding Time when ACK/NAK Time Delay is Set to 2-Slots:

Method (b-1) This method (b-1) is adapted in the case where the ACK/NAK time delay is set to 2-slots, one subpacket is received in the MS, and no subpacket is then received in the next slot, as shown in FIG. 4. This method (b-1) is the same as the aforementioned method (a). However, the above method (b-1) is adapted in the case where the ACK/NAK time delay is set to 2-slots, such that the WL125_PROC signal must be created in a different way from the aforementioned case where the ACK/NAK time delay is set to 1-slot. In other words, provided that the ACK/NAK time delay is set to 2-slots, the WL125_PROC signal having received the subpacket must be created at the second slots after passing through the first slot.

Method (b-2)

This method (b-2) is one of a variety of exemplary methods available in the case where the ACK/NAK time delay is set to 2-slots, one subpacket is received in the MS, and the other subpacket is then received in the next slot, as shown in FIG. 5. This method (b-2) basically uses the aforementioned method (a), and further adds two determination steps to those of the method (a). The method (b-2) is characterized in that it stops operating the turbo decoder by creating the INT_STOP signal at a prescribed time "INT_STOP_POS_N1", on the condition that the other subpacket is received even though one subpacket currently performs turbo decoding, and then enters a waiting mode of such turbo decoding as shown in FIG. 5. In accordance with the above-identified method (b-2), if there is no PDCH_TURBO_DONE signal, the controller determines whether the other subpacket is in a waiting mode for future use of the turbo decoder. If it is determined that the other subpacket is in the waiting mode, the controller determines whether the INT_STOP_POS_N1 time is provided. If the INT_STOP_POS_N1 time is provided, the controller generates an INT_STOP signal. Otherwise, if the INT_STOP_POS_N1 time is not provided, the controller returns to the step for determining whether the PDCH_TURBO_DONE signal has been created. If it is determined that the other subpacket is not in the waiting mode for future use of the turbo decoder, the controller performs the same operation as in the aforementioned method (a). In this case, in order to determine if the INTNT_STOP_POS_N1 time is provided or not, the controller divides 1-slot into N equal sub-slots, and assigns different values from 0 to N-1 to the N equal sub-slots, respectively. A prescribed signal created by the N equal sub-slots is called an INT_STOP_POS signal. The INT_STOP_POS_N1 signal may be selected from among many values from 0 to N-1. For example, the INT_STOP_POS_N1 signal's value can be differently determined to assign the same time to individual T3 times of two subpackets.

Method (b-3)

This method (b-3) is one of a variety of exemplary methods available in the case where the ACK/NAK time delay is set to 2-slots, one subpacket is received in the MS, and the other subpacket is then received in the next slot, as shown in FIG. 5. This method (b-3) basically uses the aforementioned method (a), and is similar to the above-identified method (b-2). In more detail, four determination steps are added to those of the method (a), and two determination steps are added to those of the method (b-2). The method (b-3) is characterized in that it differently controls turbo decoder occupancy times for every subpacket using EP size information of two subpackets, on the condition that the other subpacket is received even though one subpacket currently performs turbo decoding, and then enters a waiting mode of such turbo decoding as shown in FIG. 5. In accordance with the above-identified method (b-3), if there is no PDCH_TURBO_DONE signal, the controller determines whether the other subpacket is in a waiting mode for future use of the turbo decoder. If the other subpacket is in the waiting mode, and the EP size of the waiting subpacket is larger than that of a subpacket currently executing the turbo decoding, the controller generates the INT_STOP signal at a start time of the INT_STOP_POS_N1 signal. Otherwise, if the EP size of the waiting subpacket is less than that of the subpacket currently executing the turbo decoding, the controller generates the INT_STOP signal at a start time of the INT_STOP_POS_N2 signal. If it is determined that the other subpacket is not in the waiting mode for future use of the turbo decoder, the controller performs the same operation as in the aforementioned method (a). In this case, although it is possible for the MS to freely determine or set individual values of the INT_STOP_POS_N1 signal and the INT_STOP_POS_N2 signal, it should be noted that the INT_STOP_POS_N1 signal must be higher than the INT_STOP_POS_N2 signal. In more detail, the greater the EP size, the longer the time requisite for the turbo decoding, such that the controller must assign a much longer turbo-decoding time to a large-sized subpacket having the high EP-size value as compared to the small-sized subpacket having the low EP-size value.

A turbo-decoding time control method in the case where one subpacket is received in the MS, and the other subpacket is not received in the next slot will hereinafter be described with reference to FIG. 6. The other turbo-decoding time control method in the case where one subpacket is received in the MS, and the other subpacket is received in the next slot will hereinafter be described with reference to FIGS. 7 and 8.

Figure 6:
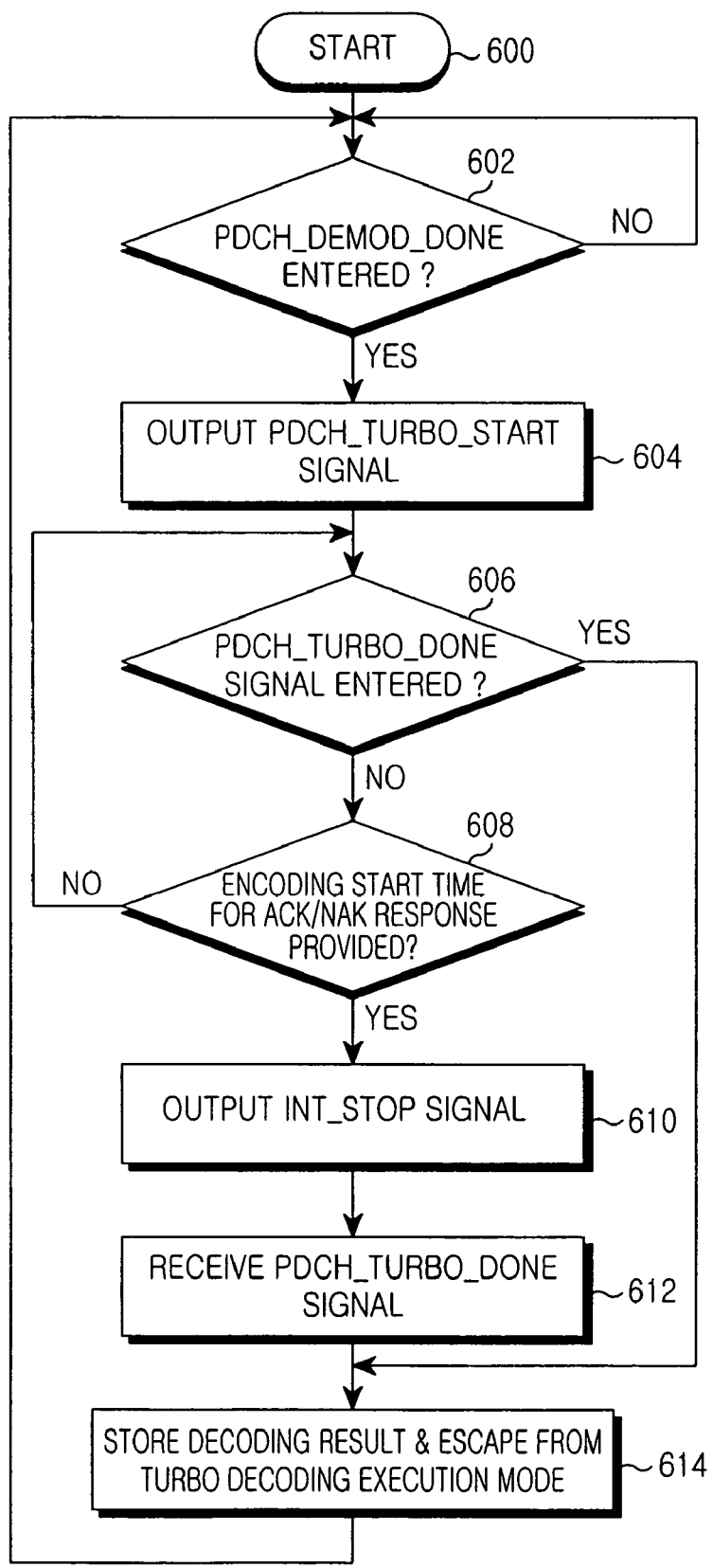
FIG. 6 is a flow chart illustrating a method for controlling a turbo decoding time of a received subpacket when the ACK/NAK time delay is equal to 1-slot or 2-slots in the high-speed packet data communication system, one subpacket is received in the MS, and then the other subpacket is not received in the next slot in accordance with an embodiment of the present invention.

FIG. 6 is a flow chart illustrating a method for controlling a turbo decoding time of a received subpacket when the ACK/NAK time delay is equal to 1-slot or 2-slots in the high-speed packet data communication system, one subpacket is received in the MS, and then the other subpacket is not received in the next slot in accordance with an embodiment of the present invention.

The turbo-decoding time control method of FIG. 6 will hereinafter be described with reference to the aforementioned descriptions of FIGS. 3 and 4 and the aforementioned methods (a) and (b-1). Referring to FIG. 6, the controller determines whether the PDCH_DEMOD_DONE signal indicative of PDCH demodulation completion of a received subpacket is received from the PDCH demodulator at step 602. If the PDCH_DEMOD_DONE signal has been received from the PDCH demodulator, the controller determines that the turbo decoding operation of the subpacket must be executed, and proceeds to step 604. The controller transmits the PDCH_TUBRO_START signal to the turbo decoder at step 604, such that it controls the turbo decoder to perform PDCH turbo decoding, and proceeds to step 606.

The controller determines whether the PDCH_TURBO_DONE signal is received from the turbo decoder at step 606. If the PDCH_TURBO_DONE signal has been received from the turbo decoder, the controller stores the turbo-decoding result in a predetermined memory, and leaves the turbo-decoding execution mode at step 614. Thereafter, the controller returns to step 602 to control PDCH turbo decoding of another subpacket. Otherwise, if the PDCH_TURBO_DONE signal has not been received from the turbo decoder at step 606, the controller proceeds to step 608.

The controller determines whether a current time reaches an encoding start time for the ACK/NAK response signal at step 608. If the current time does not reach the encoding start time for the ACK/NAK response signal, the controller returns to step 606. Otherwise, if the current time reaches the encoding start time for the ACK/NAK response signal, the controller proceeds to step 610. The controller transmits the INT_STOP signal to the turbo decoder at step 610 to command the turbo decoder to compulsorily finish PDCH turbo decoding, and proceeds to step 612. The controller receives the PDCH_TURBO_DONE signal from the turbo decoder at step 612, and proceeds to step 614. The controller stores the turbo-decoding result in the memory, and exits the turbo-decoding execution mode at step 614. Thereafter, the controller returns to step 602 to control PDCH turbo decoding of another subpacket.

In accordance with the above-identified turbo-decoding time control method shown in FIG. 6, if the ACK/NAK time delay is set to 1-slot, one subpacket is received in the MS, and the other subpacket is received in the next slot, or if the ACK/NAK time delay is set to 1-slot or 2-slots, one subpacket is received in the MS, and the other subpacket is not received in the next slot, if the encoding start time for the ACK/NAK response signal is earlier than a normal end time of subpacket's PDCH turbo decoding, the controller generates the INT_STOP signal to compulsorily finish PDCH turbo decoding in such a way that it can compulsorily terminate such unfinished PDCH turbo decoding.

Figure 7:
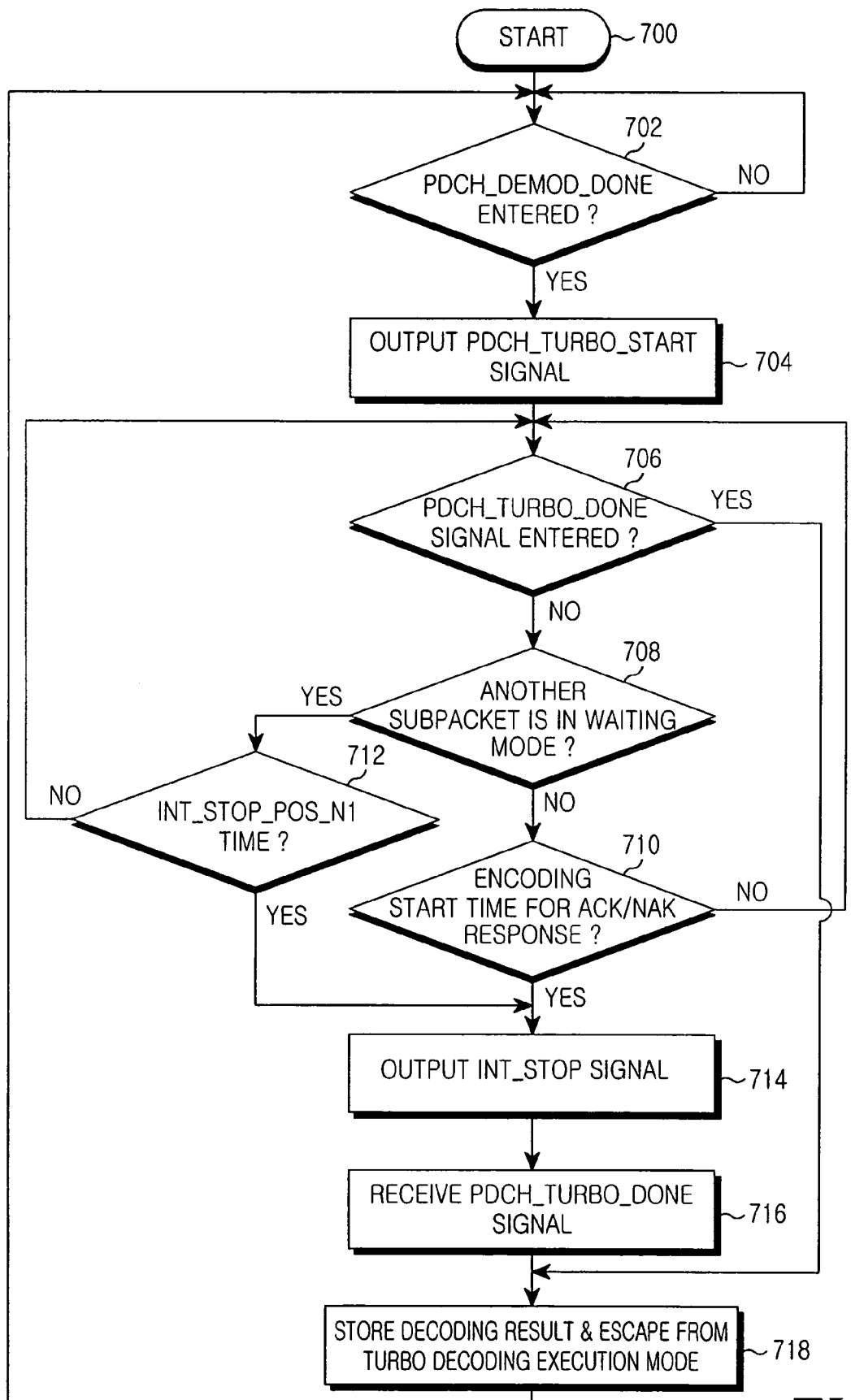
FIG. 7 is a flow chart illustrating a method for controlling a decoding time of each subpacket when the ACK/NAK time delay is equal to 2-slots in the high-speed packet data communication system, one subpacket is received in the MS, and then the other subpacket is received in the next slot in accordance with an embodiment of the present invention.

FIG. 7 is a flow chart illustrating a method for controlling a decoding time of each subpacket when the ACK/NAK time delay is equal to 2-slots in the high-speed packet data communication system, one subpacket is received in the MS, and then the other subpacket is received in the next slot in accordance with an embodiment of the present invention.

The turbo-decoding time control method of FIG. 7 will hereinafter be described with reference to the aforementioned descriptions of FIGS. 5 and 7 and the aforementioned method (b-2). Referring to FIG. 7, the controller determines whether the PDCH_DEMOD_DONE signal indicative of PDCH demodulation completion of a received subpacket is received from the PDCH demodulator at step 702. If the PDCH_DEMOD_DONE signal has been received from the PDCH demodulator, the controller determines that the PDCH turbo decoding operation of a previously-received subpacket must be executed, and proceeds to step 704. The controller transmits the PDCH_TUBRO_START signal to the turbo decoder at step 704, such that it controls the turbo decoder to perform PDCH turbo decoding of the previously-received subpacket, and proceeds to step 706.

The controller determines whether the PDCH_TURBO_DONE signal indicative of a normal completion status of the turbo decoding operation of the previously-received subpacket is received from the turbo decoder at step 706. If the PDCH_TURBO_DONE signal has been received from the turbo decoder at step 706, the controller stores the turbo-decoding result of the previously-received subpacket in a memory, and exits the turbo-decoding execution mode for the previously-received subpacket at step 718. Thereafter, the controller returns to step 702 to control PDCH turbo decoding of the next reception subpacket (also called the next subpacket). Otherwise, if the PDCH_TURBO_DONE signal has not been received from the turbo decoder at step 706, the controller proceeds to step 708.

The controller determines whether the above next subpacket is in a waiting mode for future use of the turbo decoder at step 708. For example, if the PDCH demodulator generates a predetermined signal indicative of demodulation completion of the next subpacket, and transmits it to the controller, the controller determines that the next subpacket is in the waiting mode for future use of the turbo decoder. If it is determined that the next subpacket has not been in the waiting mode at step 708, the controller proceeds to step 710. Otherwise, if it is determined that the next subpacket has been in the waiting mode at step 708, the controller proceeds to step 712.

The controller determines whether a current time reaches an encoding start time for the ACK/NAK response signal associated with the previously-received subpacket at step 710. If the current time does not reach the encoding start time at step 710, the controller returns to step 706. Otherwise, if the current time reaches the encoding start time at step 710, the controller proceeds to step 714. The controller transmits the INT_STOP signal to the turbo decoder at step 714 to command the turbo decoder to compulsorily finish PDCH turbo decoding the previously-received subpacket, and proceeds to step 716. The controller receives the PDCH_TURBO_DONE signal from the turbo decoder at step 716, and proceeds to step 718. The controller stores the turbo-decoding result in the memory, and exits the turbo-decoding execution mode at step 718. Thereafter, the controller returns to step 702.

The controller determines at step 712 whether a current time reaches a start time of the INT_STOP_POS_N1 signal (hereinafter referred to as an INT_STOP_POS_N1 time) having been previously set to a compulsory turbo-decoding end time of the previously-received subpacket, such that it can start turbo decoding the next subpacket currently in a decoding waiting mode. If the INT_STOP_POS_N1 time is not provided at step 712, the controller proceeds to step 706. Otherwise if the INT_STOP_POS_N1 time is provided at step 712, the controller proceeds to step 714. The controller transmits the INT_STOP signal to the turbo decoder at step 714 to command the turbo decoder to compulsorily finish PDCH turbo decoding the previously-received subpacket, performs steps 716 and 718, and returns to step 702 to control the PDCH turbo decoding operation of the next subpacket.

In this case, the INT_STOP_POS_N1 signal may be selected from among many values from 0 to N−1. For example, the INT_STOP_POS_N1 signal's value can be differently determined to assign the same time to individual T3 times of two subpackets.

In accordance with one aspect of the above-identified turbo-decoding time control method shown in FIG. 7, on the condition that the ACK/NAK time delay is set to 2-slots, one subpacket is received in the MS, and the other subpacket is received in the next slot, if the next subpacket is not in the PDCH turbo-decoding waiting mode while the turbo decoder currently performs PDCH turbo decoding of the previously-received subpacket, and the encoding start time for the ACK/NAK response signal is earlier than a normal end time of the PDCH turbo decoding of the previously-received subpacket, the controller generates the INT_STOP signal to compulsorily finish PDCH turbo decoding the previously-received subpacket in such a way that it can compulsorily terminate unfinished PDCH turbo decoding of the previously-received subpacket.

In accordance with another aspect of the above-identified turbo-decoding time control method shown in FIG. 7, if the next subpacket is in the PDCH turbo-decoding waiting mode while the turbo decoder currently performs PDCH turbo decoding of the previously-received subpacket, and a current time reaches the INT_STOP_POS_N1 time at which the PDCH turbo decoding operation of the next subpacket must begin even though the PDCH turbo decoding of the previously-received subpacket is still in operation (i.e., even though the current time does not reach a normal end time of the PDCH turbo decoding of the previously-received subpacket), the controller generates an INT_STOP signal to perform PDCH turbo decoding of the next subpacket in such a way that it can compulsorily terminate unfinished PDCH turbo decoding of the previously-received subpacket.

Figure 8:
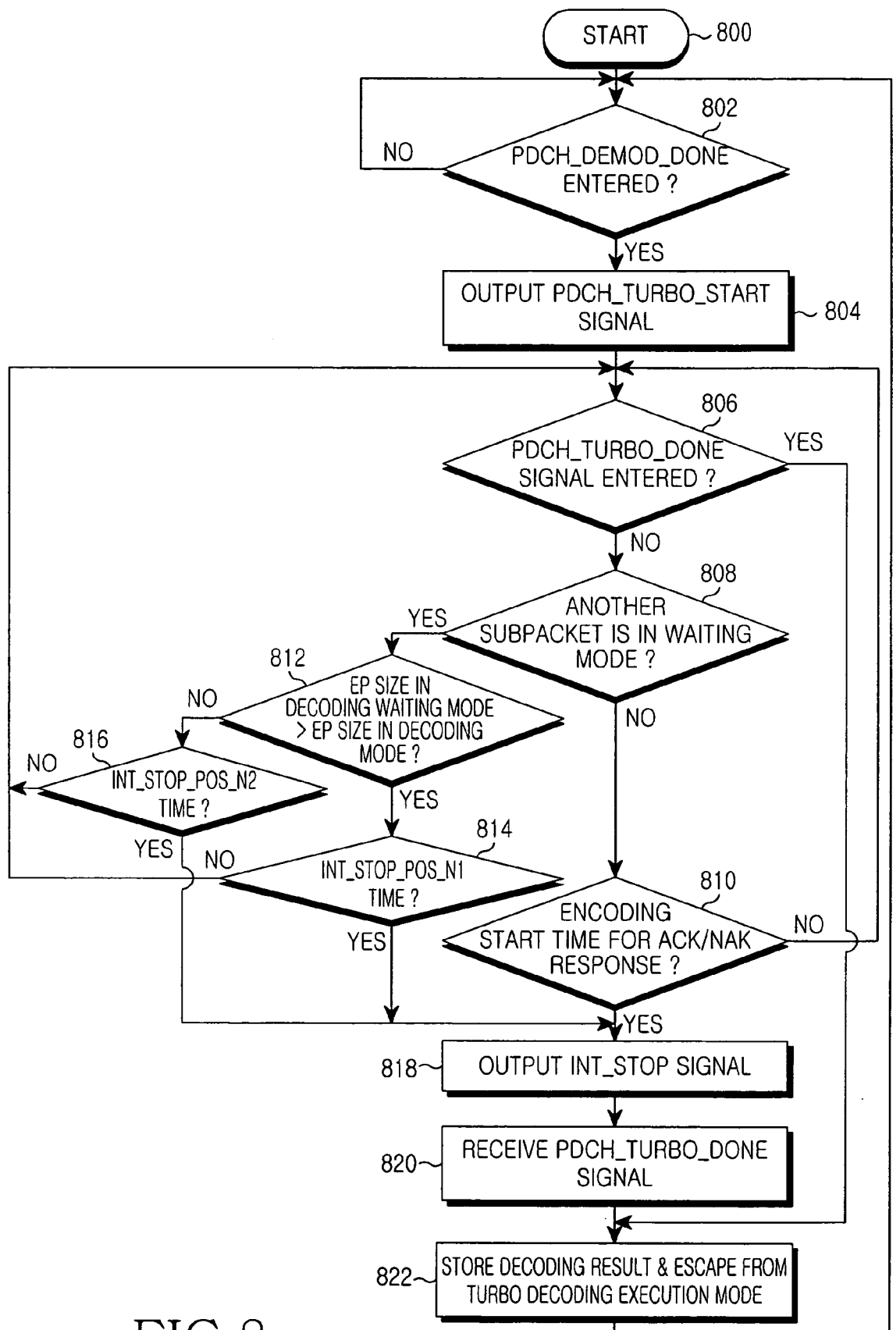
FIG. 8 is a flow chart illustrating a method for controlling a decoding time of each subpacket when the ACK/NAK time delay is equal to 2-slots in the high-speed packet data communication system, one subpacket is received in the MS, and then the other subpacket is received in the next slot in accordance with another embodiment of the present invention.

FIG. 8 is a flow chart illustrating a method for controlling a decoding time of each subpacket according to EP size information of individual subpackets when the ACK/NAK time delay is equal to 2-slots in the high-speed packet data communication system, one subpacket is received in the MS, and then the other subpacket is received in the next slot in accordance with another embodiment of the present invention.

The turbo-decoding time control method of FIG. 8 will hereinafter be described with reference to the aforementioned description of FIG. 5 and the aforementioned method (b-3). Referring to FIG. 8, the controller determines whether the PDCH_DEMOD_DONE signal indicative of PDCH demodulation completion of the previously-received subpacket is received from the PDCH decoder at step 802. If the PDCH_DEMOD_DONE signal has been received from the PDCH demodulator, the controller determines that the PDCH turbo decoding operation of the previously-received subpacket must be executed, and proceeds to step 804. The controller transmits the PDCH_TUBRO_START signal to the turbo decoder at step 804, such that it controls the turbo decoder to perform PDCH turbo decoding of the previously-received subpacket, and proceeds to step 806.

The controller determines whether the PDCH_TURBO_DONE signal indicative of a normal completion status of the turbo decoding operation of the previously-received subpacket is received from the turbo decoder at step 806. If the PDCH_TURBO_DONE signal has been received from the turbo decoder at step 806, the controller stores the turbo-decoding result of the previously-received subpacket in a memory, and escapes from the turbo-decoding execution mode for the previously-received subpacket at step 822. Thereafter, the controller returns to step 802 to control PDCH turbo decoding of the next subpacket. Otherwise, if the PDCH_TURBO_DONE signal has not been received from the turbo decoder at step 806, the controller proceeds to step 808.

The controller determines whether the above next subpacket is in a waiting mode for future use of the turbo decoder at step 808. If it is determined that the next subpacket has not been in the waiting mode at step 808, the controller proceeds to step 810. Otherwise, if it is determined that the next subpacket has been in the waiting mode at step 808, the controller proceeds to step 812.

The controller determines whether a current time reaches an encoding start time for the ACK/NAK response signal associated with the previously-received subpacket at step 810. If the current time does not reach the encoding start time at step 810, the controller returns to step 806. Otherwise, if the current time reaches the encoding start time at step 810, the controller proceeds to step 818. The controller transmits the INT_STOP signal to the turbo decoder at step 818 to command the turbo decoder to compulsorily finish PDCH turbo decoding the previously-received subpacket, and proceeds to step 820. The controller receives the PDCH_TURBO_DONE signal from the turbo decoder at step 820, and proceeds to step 822. The controller stores the turbo-decoding result in the memory, and escapes from the turbo-decoding execution mode at step 822. Thereafter, the controller returns to step 802.

The controller determines whether the EP size of the next subpacket currently in the decoding waiting mode is larger than that of the current decoding subpacket at step 812. If the EP size of the next subpacket is larger than that of the current decoding subpacket at step 812, the controller proceeds to step 814. If the EP size of the next subpacket is the same or less than that of the current decoding subpacket at step 812, the controller proceeds to step 816. The controller determines at step 814 whether a current time reaches the INT_STOP_POS_N1 time having been previously set to a first compulsory turbo-decoding end time of the previously-received subpacket, such that it can start turbo decoding the next subpacket currently in the decoding waiting mode. The controller determines at step 816 whether a current time reaches the INT_STOP_POS_N2 time having been previously set to a second compulsory turbo-decoding end time of the previously-received subpacket, such that it can start turbo decoding the next subpacket currently in the decoding waiting mode. If the INT_STOP_POS_N1 time is not provided at step 814 or the INT_STOP_POS_N2 time is not provided at step 816, the controller returns to step 806. If the INT_STOP_POS_N1 time is provided at step 814 or the INT_STOP_POS_N2 time is provided at step 816, the controller proceeds to step 818. Therefore, the controller transmits the INT_STOP signal to the turbo decoder at step 818 to command the turbo decoder to compulsorily finish PDCH turbo decoding the previously-received subpacket, performs steps 820 and 822, and returns to step 802 to control the PDCH turbo decoding operation of the next subpacket.

In this case, although it is possible for the MS to freely determine or set individual values of the INT_STOP_POS_N1 time and the INT_STOP_POS_N2 time, it should be noted that the INT_STOP_POS_N1 time value must be higher than the INT_STOP_POS_N2 time value. In more detail, the greater the EP size, the longer the time requisite for the turbo decoding, such that the controller must assign a much longer turbo-decoding time to a large-sized subpacket having the high EP-size value as compared to the small-sized subpacket having the low EP-size value.

In accordance with one aspect of the above-identified turbo-decoding time control method shown in FIG. 8, on the condition that the ACK/NAK time delay is set to 2-slots, one subpacket is received in the MS, and the other subpacket is received in the next slot, if the next subpacket is not in the PDCH turbo-decoding waiting mode while the turbo decoder currently performs PDCH turbo decoding of the previously-received subpacket, and the encoding start time for the ACK/NAK response signal is earlier than a normal end time of the PDCH turbo decoding of the previously-received subpacket, the controller generates the INT_STOP signal to compulsorily finish PDCH turbo decoding the previously-received subpacket in such a way that it can compulsorily terminate unfinished PDCH turbo decoding of the previously-received subpacket.

In accordance with another aspect of the above-identified turbo-decoding time control method shown in FIG. 8, in the case where the next subpacket is in the PDCH turbo-decoding waiting mode while the turbo decoder currently performs PDCH turbo decoding of the previously-received subpacket, and a current time reaches either one of the INT_STOP_POS_N1 time and the INT_STOP_POS_N2 time at which the PDCH turbo decoding operation of the next subpacket must begin even though the PDCH turbo decoding of the previously-received subpacket is still in operation, the controller generates INT_STOP signal to compulsorily finish PDCH turbo decoding the previously-received subpacket in such a way that it can compulsorily terminate unfinished PDCH turbo decoding of the previously-received subpacket. The INT_STOP_POS_N1 time and the INT_STOP_POS_N2 time are properly determined to assign a much longer decoding time to one packet having a larger EP size between two packets.

As apparent from the above description, a turbo decoding time control method according to the present invention allocates a turbo decoding time to individual subpackets such that it can efficiently perform decoding of the subpackets using only one turbo decoder.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a decoder when a first data and a second data are successively received in a mobile communication system, comprising the steps of:
   a) decoding the first data;
   b) determining the completion status of the decoder; and
   c) interrupting the decoding of the first data at a predetermined time before a response (ACK/NAK) time delay of the first data expires if the decoder is still in operation to decode the first data at a decoding start time of the second data.

2. The method as set forth in claim 1, further comprising the step of:
   d) decoding the second data.

3. The method as set forth in claim 2, wherein the decoding of the first and second data occurs before the response (ACK/NAK) time delay of the first data expires.

4. The method as set forth in claim 2, wherein a combined decoding time of the first and second data is maximized.

5. The method as set forth in claim 1, further comprising the step of:
   d) finishing the first data decoding operation, and storing the first data decoding result if the first data decoding operation is normally completed before the response (ACK/NAK) time expires.

6. The method as set forth in claim 1, wherein the mobile communication system is receiving a control message and at the same time receiving a data.

7. The method as set forth in claim 1, wherein the response (ACK/NAK) time delay is at least 2-slots.

8. The method as set forth in claim 1, wherein the predetermined time is determined to allow a decoding time of the first data to be equal to that of the second data.

9. The method as set forth in claim 1, wherein the predetermined time is determined to allocate a decoding time of individual data in proportion to individual data size of the first data and the second data.

10. The method as set forth in claim 1, wherein the predetermined time, upon receipt of information indicative of initial transmission or re-transmission of individual data, is determined to allow a decoding time of initial transmission data to be longer than that of re-transmission data.

11. A computer readable medium of instructions to control a decoder when a first data and a second data are successively received in a mobile communication system, the computer readable medium of instructions comprising:
    a first set of instructions to control the decoder to decode the first data;
    a second set of instructions to control the decoder to determine the completion status of the decoder; and
    a third set of instructions to control the decoder to interrupt the decoding of the first data of the decoder at a predetermined time before a response (ACK/NAK) time delay of the first data expires if the decoder is still in operation to decode the first data at a decoding start time of the second data.

12. The computer readable medium of instructions as set forth in claim 11, further comprising a forth set of instructions to control the decoder to decode the second data.

13. The computer readable medium of instructions as set forth in claim 12, wherein the decoding of the first and second data occurs before the response (ACK/NAK) time delay of the first data expires.

14. The computer readable medium of instructions as set forth in claim 12, wherein a combined decoding time of the first and second data is maximized.

15. The computer readable medium of instructions as set forth in claim 11, further comprising a forth set of instructions to control the decoder to finish the first data decoding operation and store the first data decoding result if the first data decoding operation is normally completed before the response (ACK/NAK) time expires.

16. The computer readable medium of instructions as set forth in claim 11, wherein the mobile communication system is receiving a control message and at the same time receiving a data.

17. The computer readable medium of instructions as set forth in claim 11, wherein the response (ACK/NAK) time delay is at least 2-slots.

18. The computer readable medium of instructions as set forth in claim 11, wherein the predetermined time of the third set of instructions is determined to allow a decoding time of the first data to be equal to that of the second data.

19. The computer readable medium of instructions as set forth in claim 11, wherein the predetermined time of the third set of instructions is determined to allocate a decoding time of individual data in proportion to individual data size of the first data and the second data.

20. The computer readable medium of instructions as set forth in claim 11, wherein the predetermined time of the third set of instructions, upon receipt of information indicative of initial transmission or re-transmission of individual data, is determined to allow a decoding time of initial transmission data to be longer than that of re-transmission data.

21. A method for controlling a decoder when a first data and a second data are successively received in a mobile communication system, comprising the steps of:
    a) decoding the first data using the decoder;
    b) determining a response (ACK/NAK) time delay of the first data;
    c) interrupting the decoding of the first data at a predetermined time before the response (ACK/NAK) time delay of the first data expires, if the decoder is still in operation to decode the first data at a decoding start time of the second data; and
    d) decoding the second data using the decoder at the predetermined time,
    wherein the decoding of the first and second data occurs before the response (ACK/NAK) time delay of the first data expires and a combined decoding time of the first and second data is maximized.

22. A computer readable medium of instructions to control a decoder when a first data and a second data are successively received in a mobile communication system, the computer readable medium of instructions comprising:
    a first set of instructions to control the decoder to decode the first data;
    a second set of instructions to control the decoder to determine a response (ACK/NAK) time delay of the first data;
    a third set of instructions to control the decoder to interrupt the decoding of the first data at a predetermined time before the response (ACK/NAK) time delay of the first data expires, if the decoder is still in operation to decode the first data at a decoding start time of the second data; and
    a fourth set of instructions to control the decoder to decode the second data using the decoder at the predetermined time,
    wherein the decoding of the first and second data occurs before the response (ACK/NAK) time delay of the first data expires and a combined decoding time of the first and second data is maximized.

* * * * *